June 4, 1929.  N. A. CHRISTENSEN  1,715,408
COMPRESSOR OR MOTOR
Filed June 18, 1924

INVENTOR.
NIELS A. CHRISTENSEN.
BY
ATTORNEYS.

Patented June 4, 1929.

1,715,408

UNITED STATES PATENT OFFICE.

NIELS A. CHRISTENSEN, OF MILWAUKEE, WISCONSIN.

COMPRESSOR OR MOTOR.

Application filed June 18, 1924. Serial No. 720,782.

The invention relates to lubricating means for compressors, motors and the like.

One object of the invention is to provide a simple yet highly efficient means for positively lubricating the piston of a compressor by providng a trough containing lubricant into which the skirt of the piston dips in its lowest position, which trough is constantly supplied with lubricant, and is preferably of such a height as to insure the proper amount of lubricant being taken up by the piston but not an excessive amount which would interfere with the proper operation of the compressor.

A further object of this invention is to associate the cooling system of the compressor with the lubricating system whereby the lubricant will not only keep the working parts well oiled but is also used to keep the compressor cool.

The invention further consists in the several features hereinafter set forth and more particularly defined by claims at the conclusion hereof.

Figure 1:
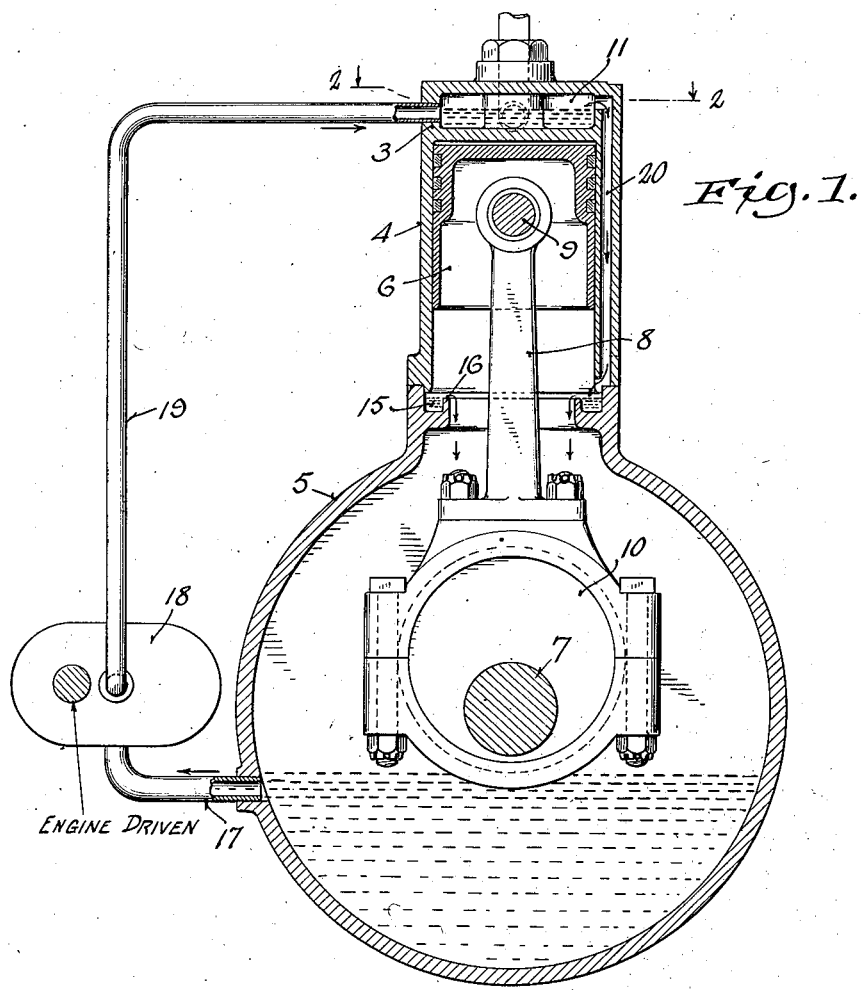
Figure 2:
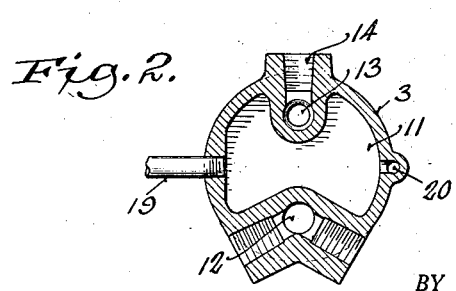

In the drawings: Fig. 1 is a vertical sectional view of a compressor or motor embodying the invention;

Fig. 2 is a sectional view through the head of the device taken on the line 2—2 of Fig. 1.

In the drawings the numeral 3 designates the head, 4 the cylinder, 5 the crank-case detachably secured to the cylinder, 6 the piston working in the cylinder and operatively connected to the drive shaft 7 in any suitable manner, as by means of a connecting-rod 8 journaled on the wrist-pin 9 and having its big end forming an eccentric strap mounted on the eccentric 10 secured to or formed integral with the shaft 7.

The head 3 has a cooling space 11 formed therein and an inlet port 12 and a discharge port 13 which are controlled by valves of well-known construction, to allow air to be drawn into the compressor and to force said air past the discharge valve to the discharge passage 14 communicating with the discharge port during the operation of the compressor.

In order to lubricate the cylinder walls of the compressor independent of a splash system, which may or may not be provided, I provide a trough 15 containing lubricant into which the lower end of the skirt of the piston dips in its lowest position, said trough being constantly supplied and kept filled with lubricant. The travel of the piston skirt into this trough is so determined as to provide the proper amount of oil to be taken up by said skirt for each stroke and carried up on the cylinder walls to lubricate the piston and its rings. Thus a predetermined quantity of oil may be supplied to the cylinder bore without danger of an over-supply which, in the case of a compressor, might lead to serious trouble. The oil is continuously supplied to the trough by a separate pump, as hereinafter described or in any other suitable manner.

The trough is conveniently formed by providing a groove in the upper end of the crank-case, the surplus oil overflowing the inner wall 16 down into the crank-case.

The lubricating system for the cylinder may also be associated with the compressor to cool the same and in the present instance the lubricating oil in the crank-case is taken through a pipe 17 to an oil pump 18, such as a gear pump, of any suitable construction, driven by the engine or other means for driving the compressor, and forced by the pump through a pipe 19 to the cooling space or reservoir 11 in the head of the compressor from whence it overflows, as shown in the drawing, through a duct 20 formed in the cylinder wall to the trough 15, the circulation of the oil through the head thus serving to cool the compressor, and the oil from the head as it is discharged therefrom serving to lubricate the piston of the compressor.

It will be understood that when the lubricant is used as a cooling medium a greater body of the lubricant is used than that contained in the crank-case of the compressor, which body of lubricant may be that of the engine with which the compressor is associated or that in a separate tank of proper capacity.

I desire it to be understood that this invention is not to be limited to any particular arrangement or construction of parts except in so far as such limitations are expressed in the claims.

What I claim as my invention is:

1. In a compressor or motor, the combination with the cooling space in the head, the cylinder and the piston working in the cylinder, of means for supplying lubricant to said cooling space, a trough containing lubricant into which the skirt of the piston dips when nearing the end of its out-stroke, and means for conducting the lubricant from said cooling space to said trough.

2. In a compressor or motor, the combination of a cylinder having a cooling reservoir in the head and an overflow passage extending through the cylinder directly from above the bottom of the reservoir to the cylinder bore below the compression space for furnishing lubricant to the piston working in said cylinder, and a pump supplying lubricant to said cooling reservoir.

In testimony whereof, I affix my signature.

NIELS A. CHRISTENSEN.